US012355682B2

(12) United States Patent
Fallon et al.

(10) Patent No.: US 12,355,682 B2
(45) Date of Patent: Jul. 8, 2025

(54) NETWORK DEVICE HAVING MULTIPLE FORWARDING DOMAINS

(71) Applicant: Arista Networks, Inc., Santa Clara, CA (US)

(72) Inventors: Paul Martin Fallon, Mountain View, CA (US); Nelson Enrique Perez, Jr., Burlingame, CA (US); Karthikeya Kumar Pandit, San Jose, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 433 days.

(21) Appl. No.: 18/063,997

(22) Filed: Dec. 9, 2022

(65) Prior Publication Data

US 2024/0195756 A1 Jun. 13, 2024

(51) Int. Cl.
*H04L 49/00* (2022.01)
*H04L 49/101* (2022.01)

(52) U.S. Cl.
CPC ............ *H04L 49/70* (2013.01); *H04L 49/101* (2013.01)

(58) Field of Classification Search
CPC .............................. H04L 49/70; H04L 49/101
USPC ........................................................ 370/252
See application file for complete search history.

(56) References Cited

U.S. PATENT DOCUMENTS

| 2005/0018673 | A1* | 1/2005 | Dropps | H04L 49/357 370/389 |
| 2010/0214949 | A1* | 8/2010 | Smith | H04L 49/70 370/254 |
| 2012/0287936 | A1* | 11/2012 | Biswas | H04L 12/4641 370/395.3 |
| 2015/0131671 | A1* | 5/2015 | Nakao | H04L 49/25 370/401 |
| 2020/0236066 | A1* | 7/2020 | Subbiah | H04L 49/25 |
| 2020/0314029 | A1* | 10/2020 | Gopinath | H04L 49/254 |
| 2023/0198676 | A1* | 6/2023 | K N | H04L 41/14 370/236 |
| 2024/0015051 | A1* | 1/2024 | Ameling | H04L 12/5601 |

* cited by examiner

*Primary Examiner* — Xuan Lu
(74) *Attorney, Agent, or Firm* — Fountainhead Law Group, PC

(57) ABSTRACT

A network device is configured with multiple forwarding domains where each forwarding domain has its own view of a front panel, referred to as a virtual front panel. The virtual front panel of a forwarding domain represents the serdes (transceivers) of that forwarding domain as virtual ports. Forwarding domains can be interconnected by an orchestrator in terms of "connecting" their respective virtual ports. The orchestrator can connect two virtual ports by configuring hardware (e.g., crosspoint switch) in the network device to create an electrical path between the physical serdes that correspond to the virtual ports.

20 Claims, 8 Drawing Sheets

NETWORK DEVICE HAVING MULTIPLE FORWARDING DOMAINS

BACKGROUND

The present disclosure relates to forwarding in a network device; e.g., routers, switch, etc. A forwarding domain includes: (1) a packet processing engine comprising hardware, such as a main chip (e.g., ASIC) and supporting chips (e.g., memory, external PHYs, etc.); and (2) various software/firmware elements (collectively "the software") to process and/or control the flow of packets through the network device. The software assumes that it has sole access over the entire network device, including the (physical) front panel and its (physical) ports. Accordingly, prior art network devices boot up with only one forwarding domain. As such, a deployment that involves the forwarding of packets between two or more forwarding domains requires installing separate switch units (boxes) in a rack and patching the switches together via their respective front panels. Such arrangements consume rack space and can consume significant amounts of power.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

The present disclosure provides support for multiple forwarding domains to co-exist in a single network device; e.g., routers, switch, etc. A forwarding domain comprises a packet processing engine comprising hardware, such as a main chip (e.g., ASIC, FPGA, etc.) and supporting chips (e.g., memory, external PHYs, etc.), and the software/firmware, forwarding tables, etc. (collectively "the software") that process and/or control the flow of packets through the network device. The present disclosure describes infrastructure in a network device that allows for the instantiation and support of multiple co-existing, independently operating forwarding domains.

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

Figure 1:
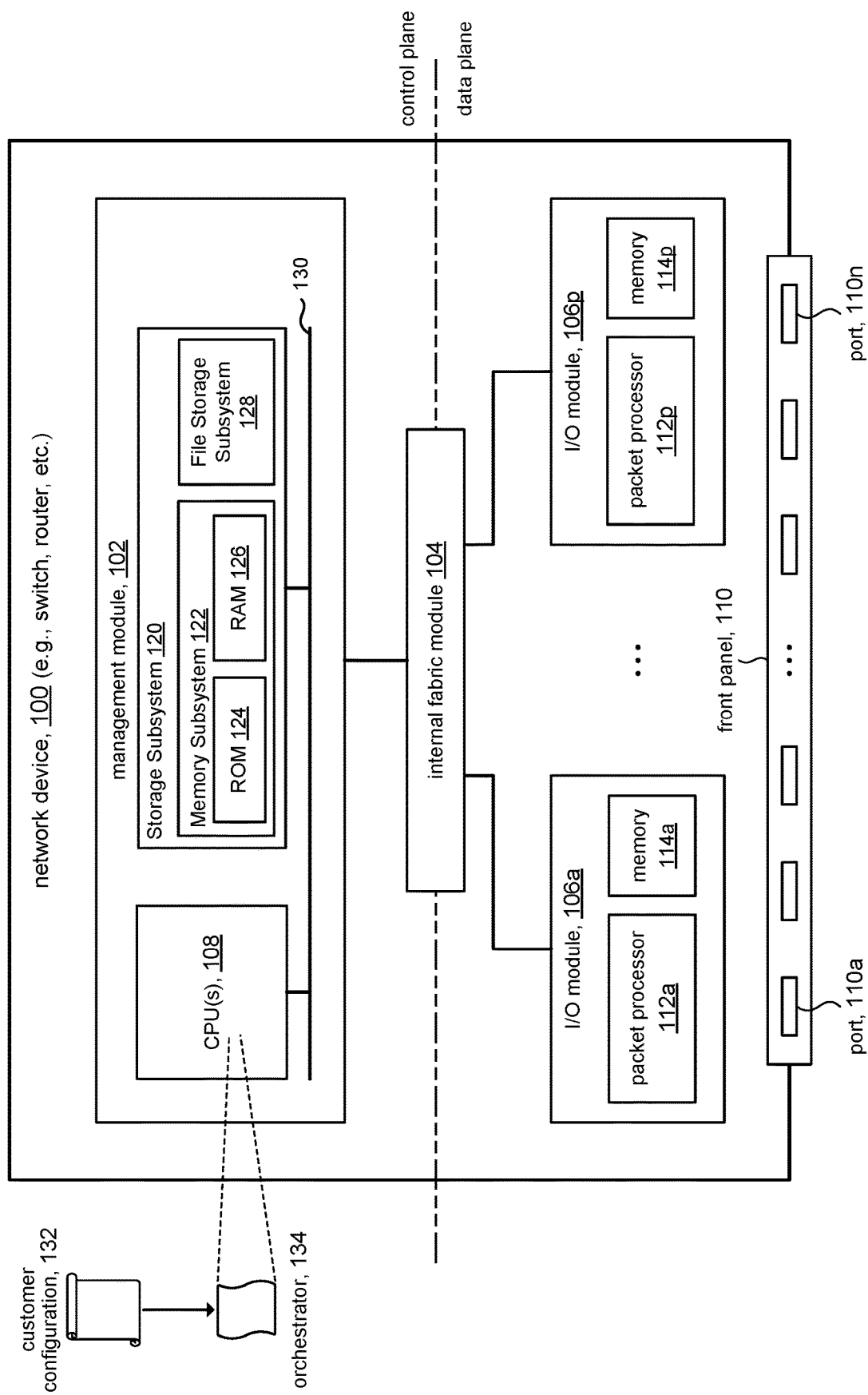
FIG. 1 is a system level block diagram of a network device in accordance with the present disclosure.

FIG. 1 is a schematic representation of a network device 100 (e.g., a router, switch, firewall, and the like) that can be adapted in accordance with the present disclosure. In some embodiments, for example, network device 100 can include a management module 102, an internal fabric module 104, a number of I/O modules 106a-106p, and a physical front panel 110 comprising I/O ports (physical interfaces) 110a-110n. Management module 102 can constitute the control plane (also referred to as a control layer or simply the CPU) of network device 100 and can include one or more management CPUs 108 for managing and controlling operation of network device 100 in accordance with the present disclosure. Each management CPU 108 can be a general-purpose processor, such as an Intel®/AMD® x86, ARM® microprocessor and the like, that operates under the control of software stored in a memory device/chips such as ROM (read-only memory) 124 or RAM (random-access memory) 126. The control plane provides services that include traffic management functions such as routing, security, load balancing, analysis, and the like.

The one or more management CPUs 108 can communicate with storage subsystem 120 via bus subsystem 130. Other subsystems, such as a network interface subsystem (not shown in FIG. 1), may be on bus subsystem 130. Storage subsystem 120 can include memory subsystem 122 and file/disk storage subsystem 128, which represent non-transitory computer-readable storage media that can store program code (e.g., orchestrator 134) and/or data, which when executed by one or more management CPUs 108, can cause one or more management CPUs 108 to perform operations in accordance with embodiments of the present disclosure.

Memory subsystem 122 can include a number of memories such as main RAM 126 for storage of instructions and data during program execution, and ROM (read-only memory) 124 in which fixed instructions and data can be stored. File storage subsystem 128 can provide persistent (i.e., non-volatile) storage for program and data files, and can include storage technologies such as solid-state drive and/or other types of storage media known in the art.

Management CPUs 108 can run a network operating system stored in storage subsystem 120. A network operating system is a specialized operating system for network device 100. For example, the network operating system can be the Arista Extensible Operating System (EOS®), which is a fully programmable and highly modular, Linux-based network operating system, developed and sold/licensed by Arista Networks, Inc. of Santa Clara, California. Other network operating systems may be used.

Bus subsystem 130 can provide a mechanism for the various components and subsystems of management module 102 to communicate with each other as intended. Although bus subsystem 130 is shown schematically as a single bus, alternative embodiments of the bus subsystem can utilize multiple busses.

Internal fabric module 104 and I/O modules 106a-106p collectively represent the data plane of network device 100 (also referred to as data layer, forwarding plane, etc.). Internal fabric module 104 represents interconnections among the various other modules of network device 100. Each I/O module 106a-106p can include a packet processing pipeline, logically represented by respective packet processors 112a-112p and memory hardware 114a-114p, to provide packet processing and forwarding capability. Each I/O module 106a-106p can be further configured to communicate over one or more ports 110a-110n on the front panel 110 to receive and forward network traffic. Packet processors 112a-112p can comprise hardware (circuitry), including for example, data processing hardware such as an ASIC (application specific integrated circuit), FPGA (field programmable array), digital processing unit, and the like. Memory hardware 114a-114p can include lookup hardware, including for example, content addressable memory such as TCAMs (ternary CAMs) and auxiliary memory such as SRAMs (static random access memory). The forwarding hardware in conjunction with the lookup hardware can provide wire speed decisions on how to process ingress packets and outgoing packets for egress. In accordance with some embodiments, some aspects of the present disclosure can be performed wholly within the data plane.

In accordance with the present disclosure, network device 100 can be configured with multiple concurrently instantiated, independently operating forwarding domains. Each forwarding domain can operate concurrently and independently of the other forwarding domains. In some embodiments, for example, network device 100 can include an orchestrator 134 to support operation of multiple independent forwarding domains by configuring (e.g., programming) the hardware in the network device in accordance with customer configuration 132. Going forward the term "subdomain" is used to refer to each forwarding domain that is instantiated and operating in the network device to process packets. These aspects of the present disclosure will now be discussed in more detail.

Figure 2:
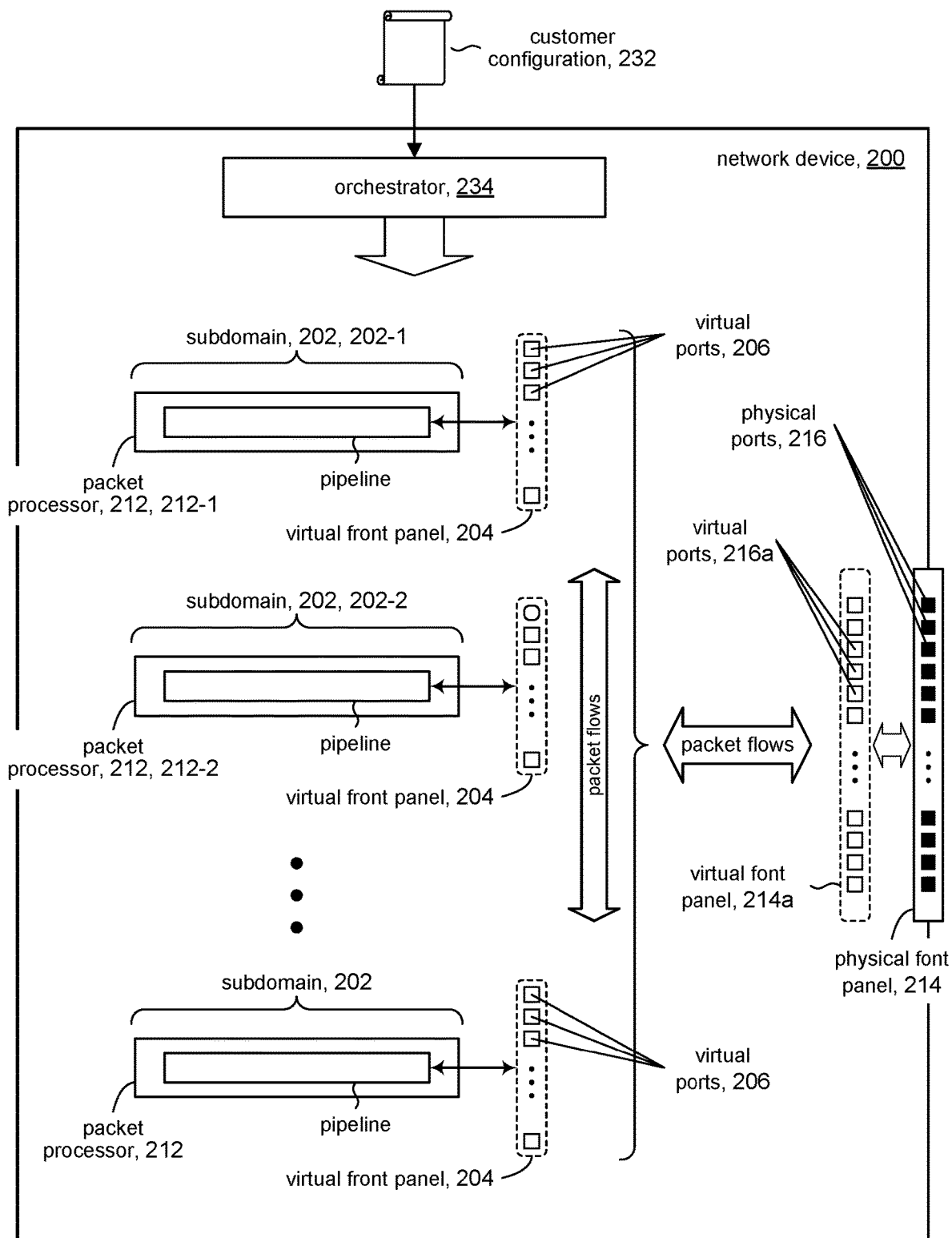
FIG. 2 is a diagrammatic representation of multiple forwarding domains (subdomains) in accordance with the present disclosure.

FIG. 2 is a generalized diagrammatic representation of multiple subdomains in a network device in accordance with the present disclosure. Network device 200 can be configured with several concurrently operating subdomains 202. A subdomain can comprise the software that controls the underlying packet processor hardware (212) in a given I/O module (e.g., 106a) and related packet processing data such as forwarding tables. For instance, subdomain 202-1 can be instantiated on packet processor 212-1 to forward packets according to a first forwarding table. Subdomain 202-2 can be instantiated on packet processor 212-2 to forward packets according to a second forwarding table different from the first forwarding table, and so on. Subdomains are not necessarily packet forwarding engines, but can be configured for general packet processing.

In some embodiments, customer configuration information 232 can specify connections (data paths) between subdomains 202 on network device 200. Configuration information 232 can be input from a user (e.g., via a command line interface, CLI). In some embodiments, configuration information 232 can be a file downloaded from a central controller, and so on. As discussed below, the configuration information can specify connections to establish data paths between subdomains by referencing their virtual front panels and virtual ports.

In accordance with the present disclosure, each subdomain 202 can be associated with a software representation of a front panel (referred to herein as virtual front panel 204) comprising software representations of physical I/O ports (referred to herein a virtual ports 206) on the subdomains; e.g., serializer/de-serializer circuits (serdes). Virtual front panels 204 provide their respective subdomains 202 with their own view, or logical instance, of a physical front panel. In accordance with the present disclosure, the actual physical front panel 214 of the network device 200, itself, can be associated with its own software representation (shown in FIG. 2 as virtual front panel 214a) comprising a software representation of physical ports 216 (shown in FIG. 2 as virtual ports 216a).

Orchestrator 234 can configure the hardware in each subdomain, as set forth in the configuration information 232, for example. In some embodiments, for example, each subdomain can be associated with one or more software agents that are responsible for configuring the hardware that constitutes the subdomain. The agents can configure the I/O hardware (e.g., port speed, etc.) on the chips associated with a given subdomain, for example, when the network device boots up.

Configuration information 232 can specify connections in the network device in terms of the virtual front panels and their corresponding virtual ports. Orchestrator 234 can verify the connections are proper and configure hardware in the network device to make the specified connections. The presence of subdomains 202 in conjunction with orchestrator 234 can facilitate the formation of topologies that would otherwise require connecting together multiple single-domain network devices.

It will become apparent from the discussion below that virtual front panels obviate the need for coordination among subdomains to gain access to front panel ports. For example, subdomain 202-1 can send/receive packets on a given port (on its virtual front panel) without requiring coordination with other subdomains to gain access to that port because each subdomain has its own view of a front panel (namely the virtual front panel) with its own set of ports (namely the virtual ports). Orchestrator 234 can ensure that connections among virtual ports are proper. Absent the use of virtual front panels and virtual ports, if subdomain 202-1 wants to communicate over physical port 216 on the physical front panel 214 of the network device 200, some form of device-wide coordination in the network device would be required to ensure that no other subdomain is using that physical port.

Figure 3A:
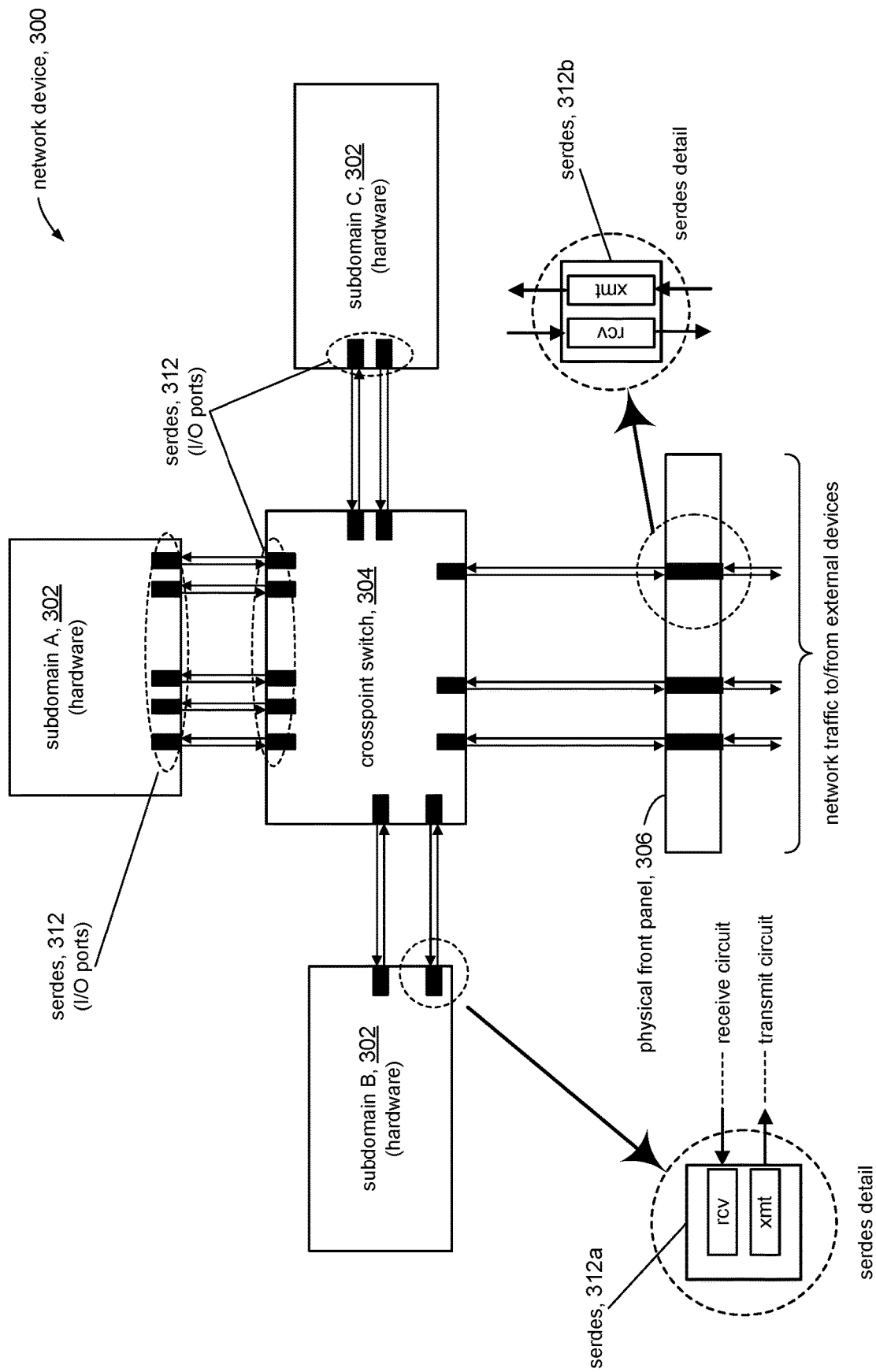
FIGS. 3A and 3B are diagrammatic representations of physical and virtual mapping in subdomains in accordance with the present disclosure.

FIG. 3A is a diagrammatic representation of a network device 300 showing an illustrative configuration of independent, concurrently operating subdomains 302. A physical front panel 306 can provide connectivity to devices outside of network device 300. A crosspoint switch 304, or other suitable cross-connect circuitry, comprising a set of ports and circuitry that can connect together its ports. Crosspoint switch 304 can connect together different subdomains that are connected to the crosspoint switch. The crosspoint switch can connect a subdomain to the physical front panel, and so on.

Each subdomain 302 comprises its own underlying packet processing hardware and software for controlling/managing the hardware. It will be appreciated that the underlying hardware can be any packet processing hardware, and is not necessarily limited to a fully L2 or L3 capable packet processing engine. A subdomain can be characterized by the following:

forwarding plane—A subdomain defines a forwarding plane that refers to the software and data for managing the flow of packets.
  hardware zone—This refers to the group of hardware chips and associated PCB (printed circuit board) traces and passive components that fall under the control of the forwarding plane.
  primary chip—The hardware zone includes at least one primary chip that provides a primary source of packet processing functionality. Primary chips can be, but are not limited to ASICs, crosspoint switches, and FPGAs.

Hardware that constitute subdomains 302, crosspoint switch 304, and front panel 306 can include physical serializer/de-serializer circuits (serdes, I/O ports) 312 for transmitting and receiving data packets. FIG. 3A shows details of a serdes 312a on a chip (e.g., FPGA) in subdomain B and details of a serdes 312b on physical front panel 306. In some embodiments, for example, each serdes comprises separate receive and transmit circuits which can operate independently of each other (commonly referred to as full-duplex operation). The subdomain can receive signals (data) on the receive signal line of the receive circuit. Conversely, the subdomain can transmit signals on the transmit line (independently and separately from the receive line) of the transmit circuit. It will be appreciated that in some embodiments, some serdes can operate in half-duplex mode.

Serdes 312 can be connected to each other via electrical connections (e.g., copper traces routed on a printed circuit board), optical connections, and so on. For example, the receive and transmit circuits of a serdes (e.g., on subdomain A) can be electrically (or optically) connected respectively to the transmit and receive circuits of another serdes (e.g., on the crosspoint switch). In some configurations, a serdes on one end of a connection may be connected to multiple different serdes at the other end of the connection. Serdes in the same hardware zone (e.g., subdomain A) can be connected together, referred to as cross-patching or cross-connecting. These and other additional connection configurations are described below.

Figure 3B:
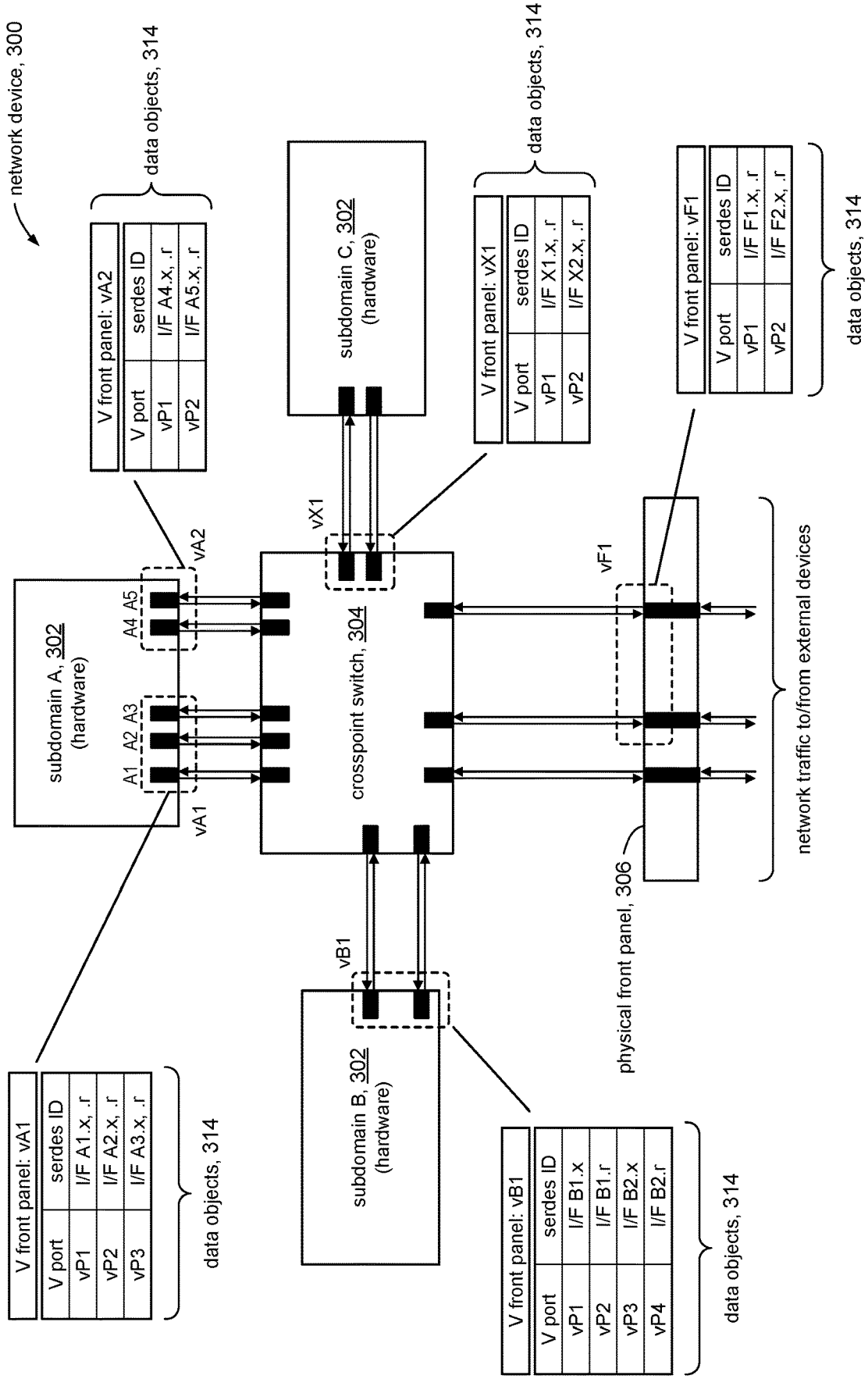

FIG. 3B shows the instantiation of software defined front panels and software defined ports (referred to herein as virtual front panels and virtual ports) in accordance with some embodiments of the present disclosure. A virtual front panel is a grouping of serdes of a subdomain; for example, subdomain B is associated with a virtual front panel vB1. In accordance with the present disclosure, the crosspoint switch 304 can also be associated with a virtual front panel. FIG. 3B, for instance, shows a virtual front panel vX1 associated with the crosspoint switch. Likewise, in accordance with the present disclosure, the physical front panel 306 can be associated with a virtual front panel. The example in FIG. 3B shows a virtual front panel vF1 associated with the physical front panel. Not all serdes are necessarily associated with a virtual front panel. FIG. 3B, for instance, shows an interface (e.g., a maintenance interface) on physical front panel 306 that is not associated with a virtual front panel. It will be appreciated that in some embodiments, a subdomain can be associated with more than one virtual front panel. FIG. 3B, for instance, shows that subdomain A is associated with two virtual front panels: vA1, vA2.

Configuration information that describes the virtual front panels and the mapping information between the virtual ports and physical serdes can be stored in memory devices (e.g., 124, 126, FIG. 1) of the network device 300, and are collectively represented in FIG. 3B as data objects 314. Information about a virtual front panel can include a description of the capabilities of the virtual front panel; e.g., speed, forwarding error correction (FEC), auto-negotiate capability, and other configurations. In some embodiments, configuration information about virtual front panels can be stored in data objects separate from the data objects that store the mapping information. In some embodiments, for example, the network device can include a common database that stores the configuration information for each virtual front panel. On the other hand, each serdes can be associated with a data structure that contains configuration and state information for that serdes; e.g., UP/DOWN status, data speed, etc. The data structure for a given serdes can include mapping information that identifies the virtual front panel and virtual port name that the serdes corresponds to. FIG. 3B, for example, shows that subdomain B comprises physical serdes B1, B2. A virtual front panel vB1 is defined that logically contains serdes B1, B2. It will be understood that configuration information for virtual front panel vB1 can be stored in a database of virtual front panels along with other virtual front panels. Although not shown, a data structure for serdes B1 can include configuration and state information for B1 plus information that maps or otherwise relates B1 to virtual front panel vB1 and to a virtual port. In this example, the transmit and receive circuits are mapped to different virtual ports, namely vP1 and vP2 respectively. Likewise for serdes B2, the data structure that contains configuration and state information for B2 can include information that maps the transmit and receive circuits of serdes B2 to virtual front panel vB1 and respective virtual ports vP3 and vP4.

FIG. 3B shows that in some embodiments the transmit circuit and receive circuit of each serdes (see serdes detail in FIG. 3A) can be individually mapped to respective virtual ports. FIG. 3B shows that both the transmit and receive circuits of serdes A1 are mapped to virtual port vP1 of front panel vA1, and likewise for the transmit and receive circuits of serdes A2 and A3. On the other hand, virtual front panel vB1 illustrates an example of separately mapped transmit and receive circuits. The figure shows that the transmit circuit of serdes B1 is mapped to virtual port vP1 of front panel vB1 and the receive circuit of serdes B1 is mapped to virtual port vP2 of front panel vB1. The figure shows that the transmit and receive circuits of serdes B2 are likewise mapped to separate virtual ports, namely vP3 and vP4.

The names of the virtual front panels and virtual ports serve as handles (labels) to circuit locations on the subdomain, namely the actual physical serdes. For example, the handle vA1.vP1.X can be understood to refer to the transmit circuit of physical serdes A1 in subdomain A1, the handle vX1.vP1.X can be understood to refer to the transmit circuit of a physical serdes X1 in crosspoint switch 304, the handle vF1.vP3.R can be understood as representing the receive circuit of a physical serdes F3 in physical front panel 306, and so on. Handles facilitate the process of configuring connections to establish data paths between the subdomains, crosspoint switch, and physical front panel because they allow customers (users) to specify the connections without having to learn and remember various specific naming conventions of the underlying serdes. Users do not have to know the specific hardware blocks involved, and in general do not have to know the internal structures and organization of the network device.

Figure 4:
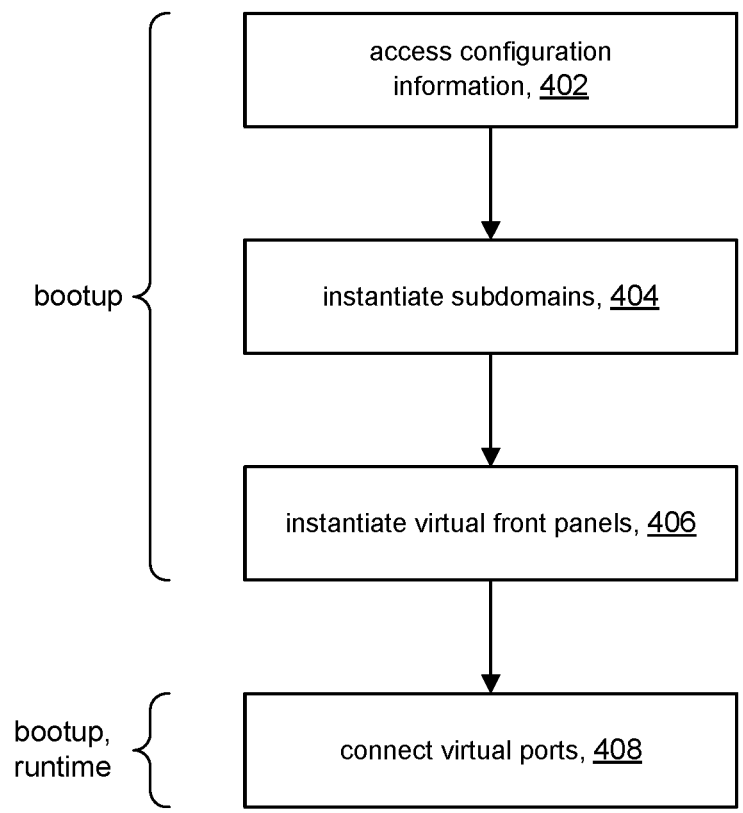
FIG. 4 is a flow for instantiating and connecting subdomains in accordance with the present disclosure.

Referring to FIG. 4, the discussion will now turn to a high-level description of processing in a network device (e.g., 200, FIG. 2) to configure subdomains in accordance with the present disclosure. In some embodiments, for example, the network device can include one or more digital processing units, which when operated, can cause the network device to perform processing in accordance with FIG. 4. Digital processing units can include general CPUs in the control plane of the network device that operate by way of executing computer program code stored on a non-volatile computer readable storage medium (e.g., read-only memory); for example, CPU 108 in the control plane (FIG. 1) can be a general CPU. Digital processing units can include specialized processors in the data plane of the network device, such as digital signal processors, field programmable gate arrays, application specific integrated circuits, and the like, that operate by way of executing computer program code or by way of logic circuits being configured for specific operations. For example, each of packet processors 112a-112p in the data plane (FIG. 1) can be a specialized processor. The operation and processing blocks described below are not necessarily executed in the order shown. Operations can be combined or broken out into smaller operations in various embodiments. Operations can be allocated for execution among one or more concurrently executing processes and/or threads.

At operation 402, the network device can access configuration information to configure and connect subdomains in the network device. In some embodiments, the configuration information can include subdomain configuration information and connection configuration information. The subdomain configuration information can be hardcoded in the network device (e.g., stored on a ROM device, on an FPGA, and so on). The subdomain configuration information can define subdomains in terms of port configuration (e.g., speed, FEC, etc.) of the serdes of the subdomain. The connection configuration information can specify connections between subdomains and connections between subdomains and the physical front panel of the network device. In some embodiments, the connection configuration information can come from one or more configuration files stored on the network device or downloaded from a central controller. In other embodiments, the connection configuration information can come from a customer (user) via a CLI (command line interface) or other suitable user interface.

At operation 404, the network device, as part of the process of booting up the network device, can instantiate one or more subdomains in accordance with the accessed subdomain configuration information. The network device can configure/program the hardware (e.g., packet processors) that constitute each subdomain in accordance with the configuration information. In some embodiments, for example, one or more configuration agents that execute in the network device can program the hardware (e.g., ASIC, FPGA, tables, supporting ICs, etc.) of each packet processor (212, FIG. 2) in accordance with the subdomain configuration information to instantiate a subdomain.

At operation 406, the network device (e.g., the orchestrator) can instantiate virtual front panels for the various blocks in the network device, including but not limited to the subdomains, any crosspoint switches, and the physical front panel. Each virtual front panel represents a group of physical serdes on the component that the virtual front panel is associated with. In some embodiments, virtual front panels can be instantiated or otherwise defined in accordance with a customer configuration file; for example, as part of booting up the network device. In other embodiments, virtual front panels can be instantiated at runtime in response to commands received from a user via a suitable user interface such as a CLI. The configuration information or user command can specify a virtual front panel by naming the virtual front panel and identifying the block (e.g., subdomain, crosspoint switch, physical front panel) to be associated with that virtual front panel. The configuration information can further specify which serdes in that block belong to that virtual front panel and assign virtual ports (names) to those serdes.

At operation 408, the network device (e.g., the orchestrator) can connect together the virtual ports defined among the virtual front panels. In accordance with the present disclosure, connections (data paths) between the physical serdes of the subdomains, crosspoint switch, and physical front panel can be specified in terms of the virtual ports to which the serdes are mapped, and in particular to the serdes handles (e.g., virtual front panel identifier and virtual port identifier). Connection configuration instructions can specify endpoints of a connection using the handles described above. In accordance with the present disclosure, a service (e.g., orchestrator 234) that executes on the network device can use mapping information in the data objects 314 to identify the physical serdes corresponding to a given handle. Referring to FIG. 3B, for instance, a reference to the handle vA2.vP1.x would map to the transmit circuit of physical serdes A4 on subdomain A. A reference to the handle vB1.vP4 would map to the receive circuit on physical serdes B2 on subdomain B, and so on.

In some embodiments, connections between serdes can be managed by the orchestrator. For a given pair of virtual ports to be connected, the orchestrator can perform the following activities:

Map the handles to their corresponding physical serdes.
Verify that an electrical path exists between the corresponding serdes that are mapped to the two virtual ports. If an electrical path does not exist, the orchestrator can throw an error; e.g., write an error message to a log file, respond with an error message on a CLI, etc.
Enforce constraints on the connection between the two virtual ports.
Configure the various hardware in the network device to effect a connection between the corresponding serdes that are mapped to the two virtual ports.

If an electrical path exists between the serdes and the constraints are met, the orchestrator can configure the hardware in the network device to establish a connection (data path) between the two serdes. If an electrical path cannot be established, the orchestrator can throw an error; e.g., write an error message to a log file, respond with an error message on a CLI, etc.; for example, an error can arise if a handle does not map to a physical serdes, if an electrical path between two serdes does not exist, if one or more constraints are not met, and so on.

In some embodiments, virtual ports can be connected in accordance with instructions in a customer configuration file; for example, as part of booting up the network device. In other embodiments, virtual ports can be connected at runtime in response to instructions (commands) received from a user via a suitable user interface such as a CLI or in response to the user providing a configuration file. For example, the following connection command:

CONNECT vA1.vP3.x TO vB1.vP2 can direct the orchestrator to establish a data path between the serdes that corresponds or otherwise maps to vA1.vP3.x and the serdes that corresponds to vB1.vP2. Referring to the example in FIG. 3B, the above connection command can be used to establish a data path between the transmit circuit of serdes A3 on subdomain A to the receive circuit of serdes B1 on subdomain B. It will be appreciated that, for discussion purposes, the command example above is expressed in a greatly simplified syntax.

In accordance with some embodiments of the present disclosure, a user at runtime can dynamically reconnect virtual ports between subdomains, crosspoint switch, and physical front panel. A user can generally enter connection commands to reconfigure virtual port connections at any time during operation of the network device without having to reboot or restart the network device for the connections to take effect. For example, the user can specify a first set of connections at one time during operation of the network device (e.g., in the morning) and, at a later time during operation of the network device (e.g., in the afternoon), specify a second set of connections without having to restart the network device. This capability affords a high degree of flexibility to efficiently manage and support operations in a production environment.

Additional details of the above orchestrator activities (verify, enforce, configure) will now be described with reference to some of the illustrative connections shown in FIGS. 5A, 5B, and 5C. These figures are schematic representations of a non-exhaustive sample of connection configurations among subdomains 502, crosspoint switch 504, and physical front panel 506 in accordance with various embodiments of the present disclosure. The figures show virtual front panels 508 defined on subdomains 502. The virtual front panels include virtual ports that map to or otherwise represent corresponding physical serdes on the associated subdomains (e.g., per data objects 314). For purposes of describing FIGS. 5A 5B, and 5C, a given virtual port and the serdes that is mapped to that virtual port will be identified by the same name. For example, virtual ports named a1 to a5 on the FPGA-1 virtual front panel represent corresponding physical serdes named a1 to a5 of FPGA-1. On the other hand, virtual front panels are not defined on crosspoint switch 504 and physical front panel 506, and so only their physical serdes are shown, namely serdes x1 to x12 on crosspoint switch 504 and serdes p1 to p3 on physical front panel 506. For simplicity's sake, the connections between physical serdes are shown by single lines with the understanding that a single line represents a receive line/transmit line pair.

Verify Electrical Path Exists

A serdes can source (read from) another serdes if there is an electrical path between the two serdes. An electrical path can be a physical copper trace connecting the two serdes. Referring for a moment to FIG. 5A, for example, shows a connection between serdes a1 on FPGA-1 and serdes b1 on FPGA-2 that can comprise a copper trace. An electrical path can include a crosspoint switch or other suitable cross-connect device that electrically connects two serdes. Referring again to FIG. 5A, for example, serdes c1 on the ASIC subdomain can be deemed to be in electrical contact with serdes a5 on FPGA-1 via crosspoint switch 504.

Enforce Constraints

If an electrical path exists, the orchestrator can enforce certain constraints or rules on the serdes at both ends of the electrical path. Some constraints may be electrical in nature, and other constraints may be user-imposed rules on what connections are allowed and not allowed. Following is an illustrative non-exhaustive list of constraints that may apply. It will be appreciated that in various embodiments, alternative and/or additional constraints may apply:

- A serdes can be sourced unidirectionally or bidirectionally. For example, a user may decide that serdes A can send data to serdes B but cannot receive data from serdes B, or vice versa. Conversely, the user may decide that serdes A can receive data from and send data to serdes B (bidirectional sourcing).
- A serdes can only source (read from) one serdes. In other words, a serdes cannot receive packets from two different serdes. Stated differently, the receive circuit of a serdes can be connected only to one transmit circuit of another serdes.
- A serdes can be sourced by (read by) any number of serdes. In other words, the transmit circuit on a given serdes can connect to the receive circuits of multiple serdes so that packets can be mirrored to any number of destinations; e.g., multicast traffic, packet mirroring, etc.

Configure Hardware

In response to a determination that an electrical path exists and the constraints (if any) are met, the orchestrator can configure, in necessary, hardware in the network device to set up a data patch between the serdes. Referring to FIG. 5A, for example, a connection between serdes a1 (FPGA-1) and b1 (FPGA-2) already exists; the connection is a physical copper trace between the two serdes and as such the orchestrator does not have to configure any hardware. On the other hand, it can be seen that a connection between serdes a2 (FPGA-1) and b2 (FPGA-2) requires the orchestrator to configure the crosspoint switch 504 to establish a connection between its serdes x4 and x5.

Referring again to FIGS. 5A and 5B, the discussion will now turn to some examples of connection configurations between virtual ports in accordance with the present disclosure. Because virtual ports represent physical serdes on the subdomains, crosspoint switches, and physical front panels, connecting virtual ports effectively connects these blocks. Each connection configuration is identified by a circled number.

Figure 5A:
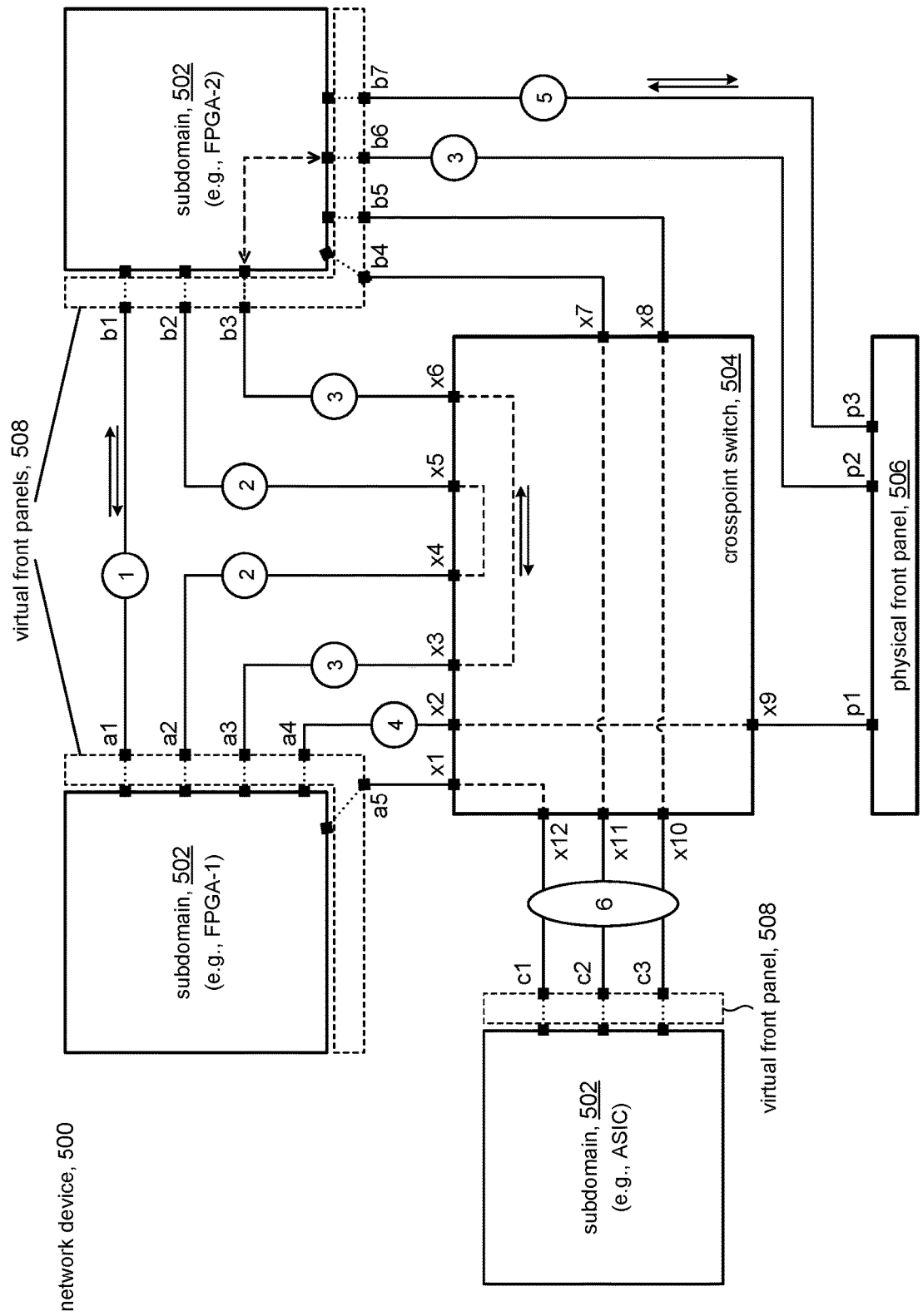
FIGS. 5A, 5B, and 5C are illustrative connection configurations in accordance with the present disclosure.

It will be understood that the examples shown in FIG. 5A are bidirectional connections. For the examples shown in FIG. 5A, each line will be understood to represent a receive line/transmit line pair. Consider the connection between serdes a1 and b1, for instance. It will be understood that the transmit circuit of serdes a1 connects to the receive circuit of serdes b1, and the transmit circuit of b1 connects to the receive circuit of a1.

Configuration 1

This connection configuration illustrates an embodiment of directly patched virtual ports. Virtual port (serdes) a1 on FPGA-1 and virtual port (serdes) b1 on FPGA-2 because the connection does not involve crosspoint switch 504. For example, packets that exit FPGA-1 on the transmit circuit of serdes a1 arrive at FPGA-2 directly on the receive circuit of serdes b1. Conversely, FPGA-1 receives packets on the receive circuit of serdes a1 that are transmitted by FPGA-2 by the transmit circuit of serdes b1.

Configuration 2

This connection configuration illustrates an embodiment of virtual ports patched via the crosspoint switch. FIG. 5A shows FPGA-1 can be patched to FPGA-2 via crosspoint switch 504. Packets that exit FPGA-1 on the transmit circuit of serdes a2 arrive at FPGA-2 directly on the receive circuit of serdes b2. Conversely, FPGA-1 receives packets on the receive circuit of serdes a2 that are transmitted by FPGA-2 on the transmit circuit of serdes b2.

Configuration 3

This connection configuration illustrates an embodiment of patching from a subdomain to the front panel 506. Virtual port a3 on FPGA-1 can be patched to virtual port b3 on FPGA-2 via the crosspoint switch as shown. FPGA-2 can then send traffic received at serdes b3 to virtual port (serdes) b6, which is connected to physical serdes p2. This configuration may be used to allow FPGA-2 to process packets from FPGA-1 before egressing the packets on the front panel 506.

Configuration 4

This connection configuration illustrates an embodiment of patching a subdomain to the front panel via a crosspoint switch. As shown in FIG. 5A, for example, virtual port a4 on FPGA-1 can be patched to serdes x2 on the crosspoint switch. The crosspoint switch can be configured to switch serdes x2 to serdes x9 which is connected to the front panel

506. Packets exiting FPGA-1 on the transmit circuit of serdes a4 will arrive on the receive circuit of physical port p1 via the crosspoint switch, and vice versa, packets received from an external device (not shown) connected to serdes p1 will flow from the transmit circuit of serdes p1 into crosspoint switch 504 and arrive at FPGA-1 on the receive circuit of serdes a4.

Configuration 5

As shown in FIG. 5A, this connection configuration illustrates an example of a subdomain that has a patch directly to the front panel. Traffic that exits FPGA-2 on virtual port b7 arrives directly on corresponding physical port p3 of front panel 506 without flowing through the crosspoint switch, and vice versa traffic received on physical port p3 will enter network device 600 on physical port p3, and arrive at FPGA-2 on virtual port b7 without flowing through the crosspoint switch.

Configuration 6

This connection configuration illustrates an example of an "internal" subdomain. In accordance with the present disclosure, a subdomain need not be connected to the front panel 506. The subdomain's serdes can all be internal connections, for example, to other subdomains or even back to itself. FIG. 5A shows, for instance, that the ASIC subdomain is connected only to FPGA-1 and FPGA-2 via the crosspoint switch 504. Traffic that exits the transmit circuits of serdes c1, c2, c3 on the ASIC will arrive at the receive circuit of serdes a5 on FPGA-1 and the receive circuits of serdes b4, b5 on FPGA-2, and vice versa.

Figure 5B:
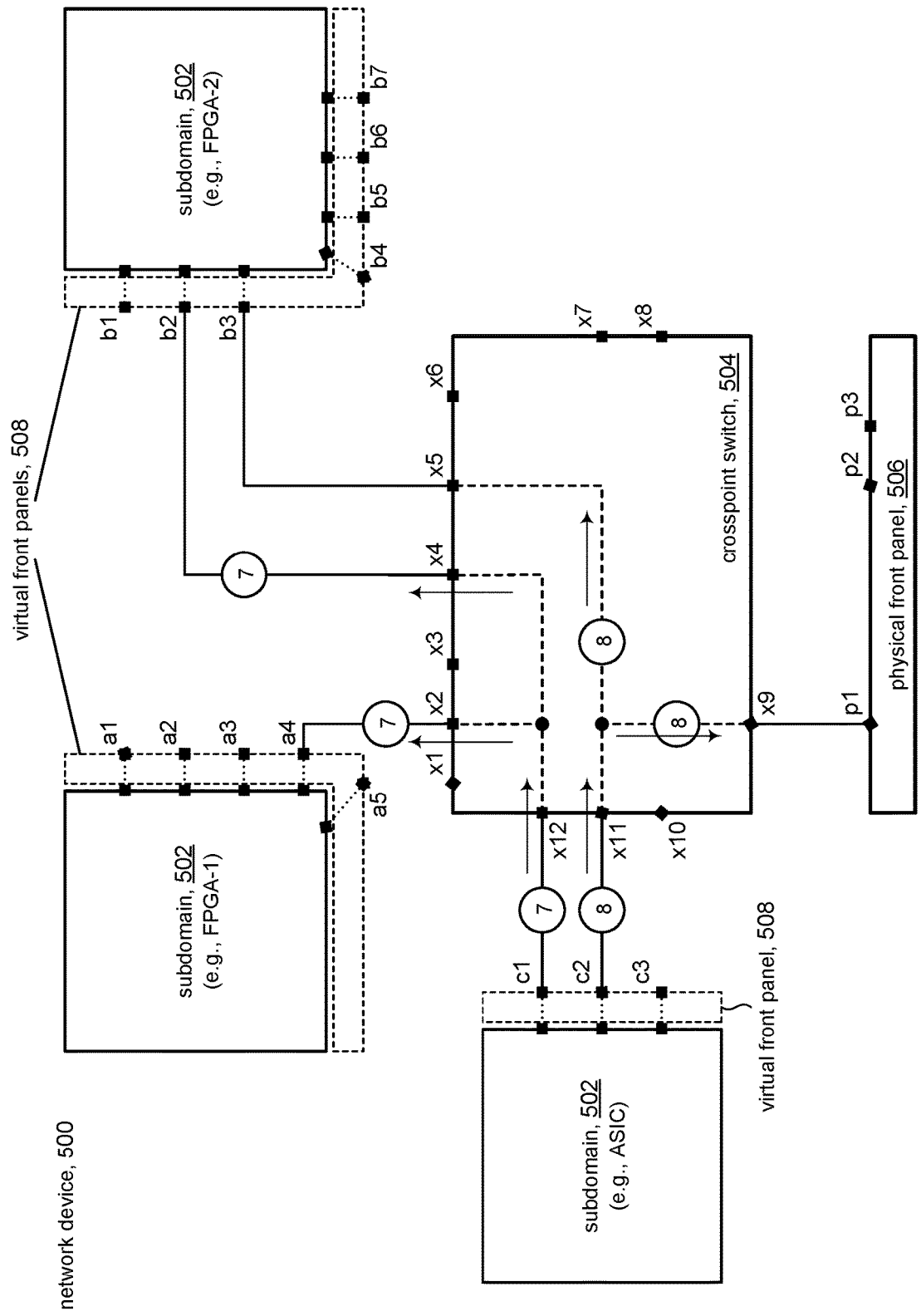

The configuration examples shown in FIG. 5B are examples of unidirectional connections. For the examples shown in FIG. 5B, each line will be understood to represent a unidirectional connection between the transmit circuit of one serdes (e.g., serdes c1) and the receive circuit of one or more serdes (serdes a4, b2).

Configuration 7

As shown in FIG. 5B, this connection configuration illustrates an example of connecting a virtual port to virtual ports on other subdomains. For example, the figure shows that virtual port c1 on the ASIC can be connected to virtual port a4 on FPGA-1 and to virtual port b2 on FPGA-2 via the crosspoint switch. In other words, an electrical path between serdes c1 can be established to serdes a4 and b2. Traffic exiting the ASIC on the transmit circuit of serdes c1 will be received, via crosspoint switch 504, on the receive circuits of serdes a4 (FPGA-1) and b2 (FPGA-2).

Configuration 8

Referring to FIG. 5B, this connection configuration illustrates an example of connecting a virtual port on one subdomain to the virtual port on another subdomain and to a physical port on the physical front panel 506. For example, the figure shows that virtual port c2 on the ASIC can be connected to virtual port b3 on FPGA-2 and to physical port p1 on the front panel 506, via the crosspoint switch 504. Traffic exiting the ASIC on the transmit circuit of serdes c2 will be received on the receive circuits of serdes b3 and serdes p1.

Configuration 9

Figure 5C:
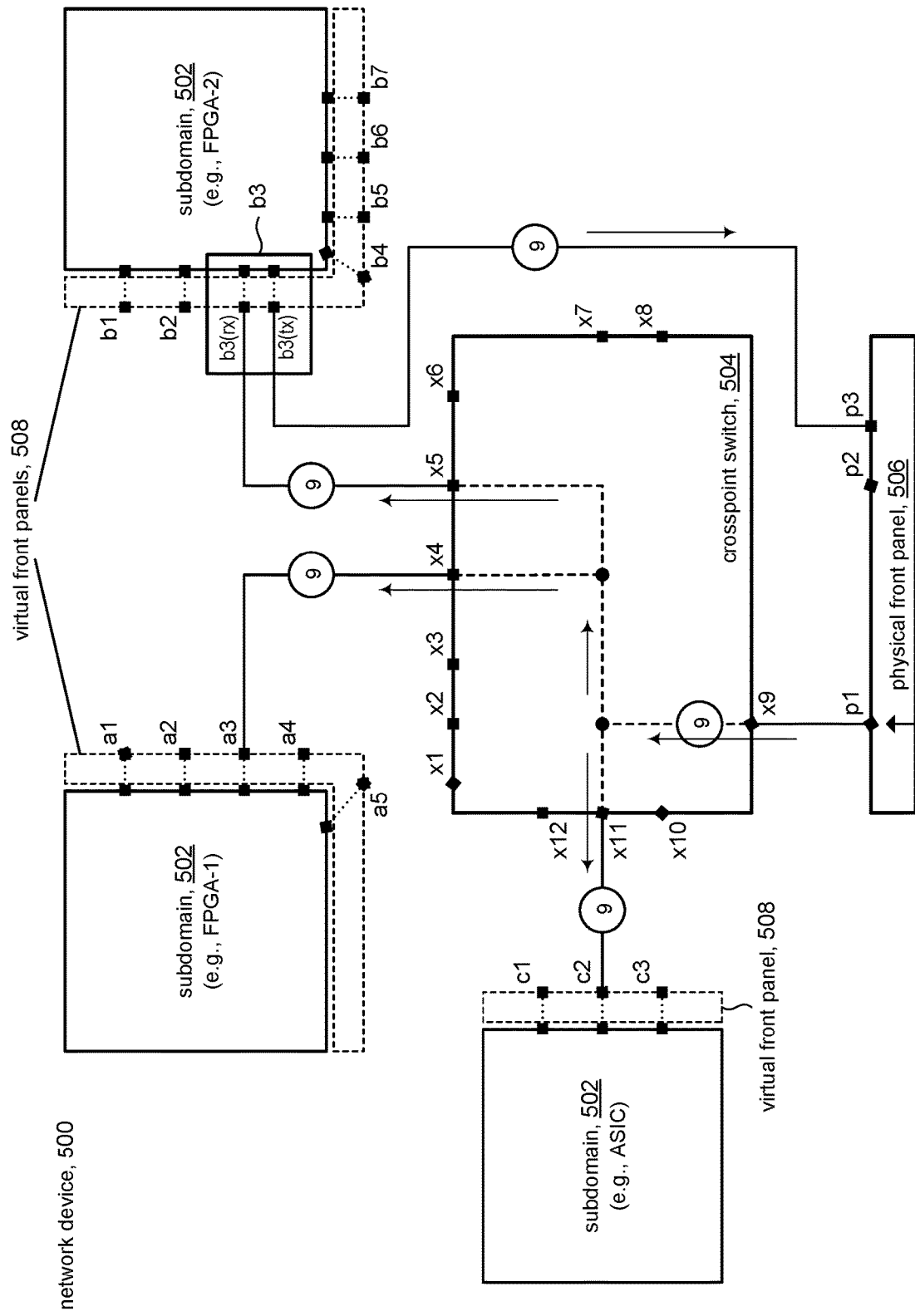

Referring to FIG. 5C, this connection configuration illustrates an example of traffic from an external device that ingresses on the front panel 506. The traffic is mirrored via crosspoint switch 504 to virtual port c2 on the ASIC, virtual port a3 on FPGA-1, and virtual port b3 on FPGA-2.

Configuration 9 further shows an example of "splitting" the transmit and receive lines of a serdes, allowing the serdes to receive and send traffic independently of each other. As shown in FIG. 5C, serdes b3 on FPGA-2 includes a receive circuit b3($rx$) and a transmit circuit be(tx). FPGA-2 can receive traffic (e.g., from the front) panel on the receive circuit of serdes b3, and can send traffic (e.g., to the front panel) from the transmit circuit of serdes b3.

Further Examples

Features described above as well as those claimed below may be combined in various ways without departing from the scope hereof. The following examples illustrate some possible, non-limiting combinations:

(A1) A method in a network device, the method comprising: instantiating a plurality of forwarding domains (subdomains); associating a virtual front panel with each subdomain, the virtual front panel representing one or more serdes (serializer/de-serializer circuits) of the associated subdomain, the virtual front panel including virtual ports that represent one or more serdes on the associated subdomain; receiving connection information for a connection between a first subdomain and a second subdomain, the connection information comprising a first handle that identifies a circuit location on the first subdomain and a second handle that identifies a circuit location on the second subdomain, wherein the first handle designates a first virtual front panel associated with the first subdomain and a first virtual port in the first virtual front panel, wherein the second handle designates a second virtual front panel associated with the second subdomain and a second virtual port in the second virtual front panel; identifying a serdes on the first subdomain that corresponds to the first handle; identifying a serdes on the second subdomain that corresponds to the second handle; and configuring hardware in the network device to establish an electrical path between the serdes on the first subdomain and the serdes on the second subdomain.

(A2) For the method denoted as (A1), each subdomain comprises packet processing hardware comprising a plurality of integrated circuit (IC) chips that are separate and independent of IC chips corresponding to other subdomains among the plurality of subdomains.

(A3) For the method denoted as any of (A1) through (A2), the first and second subdomains are connected to a crosspoint switch, wherein configuring the hardware includes configuring the crosspoint switch.

(A4) The method denoted as any of (A1) through (A3), further comprising receiving the connection information from a user via a user interface.

(A5) The method denoted as any of (A1) through (A4), further comprising configuring hardware in the network device to establish the electrical path between the serdes on the first subdomain and the serdes on the second subdomain without restarting the network device.

(A6) For the method denoted as any of (A1) through (A5), identifying the first and second serdes is based on information stored in the network that associates the first and second handles respectively to the first and second serdes.

(A7) The method denoted as any of (A1) through (A6), further comprising configuring hardware in the network device to establish an electrical path between the serdes on the first subdomain and a serdes on a third subdomain, wherein packets are transmitted from a transmit circuit of the serdes of the first subdomain and to receive circuits of the serdes of the second and third subdomains respectively.

(A8) The method denoted as any of (A1) through (A7), further comprising configuring hardware in the network device to establish an electrical path between the serdes on the first subdomain and a physical port on a physical front panel of the network device, wherein packets are transmitted from the serdes of the first subdomain and to the serdes of the second subdomain and to the physical port on the front panel.

(A9) The method denoted as any of (A1) through (A8), further comprising configuring hardware in the network device to establish an electrical path between the serdes on the first subdomain and a physical port on a physical front panel of the network device, wherein packets received on physical port are transmitted to the first and second subdomains.

(A10) For the method denoted as any of (A1) through (A9), the first and second subdomains are the same subdomain.

(B1) A network device comprising: one or more computer processors; and a computer-readable storage device comprising instructions for controlling the one or more computer processors to: associate a virtual front panel for each forwarding domain in a plurality of forwarding domains, the virtual front panel including a plurality of virtual ports that correspond to a plurality of input/output (I/O) circuits of the forwarding domain; receive input from a user that specifies (1) a first virtual front panel and a first virtual port on the first virtual front panel and (2) a second virtual front panel and a second virtual port on the second virtual front panel, wherein the first virtual front panel and first virtual port identify a first I/O circuit on a first forwarding domain, wherein the second virtual front panel and second virtual port identify a second I/O circuit on a second forwarding domain; and configure hardware in the network device to establish an electrical path between the first I/O circuit and the second I/O circuit.

(B2) For the network device denoted as (B1), each subdomain comprises packet processing hardware comprising a plurality of integrated circuit (IC) chips that are separate and independent of IC chips of other subdomains among the plurality of subdomains.

(B3) For the network device denoted as any of (B1) through (B2), the first and second subdomains are connected to a crosspoint switch, wherein configuring the hardware includes at least configuring the crosspoint switch.

(B4) For the network device denoted as any of (B1) through (B3), the computer-readable storage device further comprises instructions for controlling the one or more computer processors to receive input that specifies a third virtual front panel and a third virtual port which identifies a third I/O circuit on a third forwarding domain; and configure the hardware to establish an electrical path between the third I/O circuit and a port on a physical front panel of the network device.

(B5) For the network device denoted as any of (B1) through (B4), the computer-readable storage device further comprises instructions for controlling the one or more computer processors to receive input that specifies a third virtual front panel and a third virtual port which identifies a third I/O circuit on a third forwarding domain; and configure the hardware to establish an electrical path from the first I/O port to third I/O port in addition to the electrical path between the first I/O circuit and the second I/O circuit.

(B6) For the network device denoted as any of (B1) through (B5), the computer-readable storage device further comprises instructions for controlling the one or more computer processors to receive the user input from a user interface.

(C1) A network device comprising: a storage system comprising one or more storage devices; a physical front panel comprising a plurality of physical ports; and a plurality of packet processing circuitry (subdomains), concurrently operable to process data packets and to send and receive data packets, the packet processing circuitry of each subdomain comprising a plurality of IC devices that are different from IC device of the packet processing circuitry of other subdomains and operating independently of the IC devices of the other packet processing circuitry of the other subdomains, each subdomain associated with a virtual front panel comprising virtual ports that represent physical I/O ports of the packet processing circuitry of that subdomain, information for the virtual front panel and virtual ports for each subdomain being stored in the storage system of the network device, wherein data paths among the subdomains and the physical front panel are established by making reference to the virtual front panels and virtual ports.

(C2) For the network device denoted as (C1), the physical front panel is associated with a virtual front panel comprising virtual ports that represent physical I/O ports on the physical front panel.

(C3) The network device denoted as any of (C1) through (C2), further comprising a crosspoint switch to which one or more of the subdomains are connected, wherein the data paths among the subdomains include the crosspoint switch.

(C4) The network device denoted as any of (C1) through (C3), further comprising one or more computer processors and a computer-readable storage device having computer executable instructions that control the one or more computer processors to: receive a first handle that designates a first virtual front panel and first virtual port and a second handle that designates a second virtual front panel and second virtual port; and operate the crosspoint switch to establish a data path between an I/O port on a first subdomain identified by the first handle and an I/O port on a second subdomain identified by the second handle.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method in a network device, the method comprising:
instantiating a plurality of forwarding domains (subdomains);
associating a virtual front panel with each subdomain, the virtual front panel representing one or more serdes (serializer/de-serializer circuits) of the associated subdomain, the virtual front panel including virtual ports that represent one or more serdes on the associated subdomain;
receiving connection information for a connection between a first subdomain and a second subdomain, the connection information comprising a first handle that identifies a circuit location on the first subdomain and a second handle that identifies a circuit location on the second subdomain, wherein the first handle designates a first virtual front panel associated with the first subdomain and a first virtual port in the first virtual front panel, wherein the second handle designates a second virtual front panel associated with the second subdomain and a second virtual port in the second virtual front panel;

identifying a first serdes on the first subdomain that corresponds to the first handle;

identifying a second serdes on the second subdomain that corresponds to the second handle; and configuring hardware in the network device to establish an electrical path between the serdes on the first subdomain and the serdes on the second subdomain.

2. The method of claim 1, wherein each subdomain comprises packet processing hardware comprising a plurality of integrated circuit (IC) chips that are separate and independent of IC chips corresponding to other subdomains among the plurality of subdomains.

3. The method of claim 1, wherein the first and second subdomains are connected to a crosspoint switch, wherein configuring the hardware includes configuring the crosspoint switch.

4. The method of claim 1, further comprising receiving the connection information from a user via a user interface.

5. The method of claim 1, further comprising configuring hardware in the network device to establish the electrical path between the serdes on the first subdomain and the serdes on the second subdomain without restarting the network device.

6. The method of claim 1, wherein identifying the first and second serdes is based on information stored in the network device that associates the first and second handles respectively to the first and second serdes.

7. The method of claim 1, further comprising configuring hardware in the network device to establish an electrical path between the serdes on the first subdomain and a serdes on a third subdomain, wherein packets are transmitted from a transmit circuit of the serdes of the first subdomain and to receive circuits of the serdes of the second and third subdomains respectively.

8. The method of claim 1, further comprising configuring hardware in the network device to establish an electrical path between the serdes on the first subdomain and a physical port on a physical front panel of the network device, wherein packets are transmitted from the serdes of the first subdomain and to the serdes of the second subdomain and to the physical port on the front panel.

9. The method of claim 1, further comprising configuring hardware in the network device to establish an electrical path between the serdes on the first subdomain and a physical port on a physical front panel of the network device, wherein packets received on physical port are transmitted to the first and second subdomains.

10. The method of claim 1, wherein the first and second subdomains are the same subdomain.

11. A network device comprising:
one or more computer processors; and
a computer-readable storage device comprising instructions for controlling the one or more computer processors to:
associate a virtual front panel for each forwarding domain in a plurality of forwarding domains, the virtual front panel including a plurality of virtual ports that correspond to a plurality of input/output (I/O) circuits of the forwarding domain;
receive input from a user that specifies (1) a first virtual front panel and a first virtual port on the first virtual front panel and (2) a second virtual front panel and a second virtual port on the second virtual front panel, wherein the first virtual front panel and first virtual port identify a first I/O circuit on a first forwarding domain,
wherein the second virtual front panel and second virtual port identify a second I/O circuit on a second forwarding domain; and
configure hardware in the network device to establish an electrical path between the first I/O circuit and the second I/O circuit.

12. The network device of claim 11, wherein each forwarding domain comprises packet processing hardware comprising a plurality of integrated circuit (IC) chips that are separate and independent of IC chips of other forwarding domains among the plurality of forwarding domains.

13. The network device of claim 11, wherein the first and second forwarding domains are connected to a crosspoint switch, wherein configuring the hardware includes at least configuring the crosspoint switch.

14. The network device of claim 11, wherein the computer-readable storage device further comprises instructions for controlling the one or more computer processors to receive input that specifies a third virtual front panel and a third virtual port which identifies a third I/O circuit on a third forwarding domain; and configure the hardware to establish an electrical path between the third I/O circuit and a port on a physical front panel of the network device.

15. The network device of claim 11, wherein the computer-readable storage device further comprises instructions for controlling the one or more computer processors to receive input that specifies a third virtual front panel and a third virtual port which identifies a third I/O circuit on a third forwarding domain; and configure the hardware to establish an electrical path from the first I/O circuit to a third I/O circuit in addition to the electrical path between the first I/O circuit and the second I/O circuit.

16. The network device of claim 11, wherein the computer-readable storage device further comprises instructions for controlling the one or more computer processors to receive the user input from a user interface.

17. A network device comprising:
a storage system comprising one or more storage devices;
a physical front panel comprising a plurality of physical ports; and
a plurality of packet processing circuitry (subdomains), concurrently operable to process data packets and to send and receive data packets, the packet processing circuitry of each subdomain comprising a plurality of IC devices that are different from IC device of the packet processing circuitry of other subdomains and operating independently of the IC devices of the other packet processing circuitry of the other subdomains,
each subdomain associated with a virtual front panel comprising virtual ports that represent physical I/O ports of the packet processing circuitry of that subdomain,
information for the virtual front panel and virtual ports for each subdomain being stored in the storage system of the network device,
wherein data paths among the subdomains and the physical front panel are established by making reference to the virtual front panels and virtual ports.

18. The network device of claim 17, wherein the physical front panel is associated with a virtual front panel comprising virtual ports that represent physical I/O ports on the physical front panel.

19. The network device of claim 17, further comprising a crosspoint switch to which one or more of the subdomains are connected, wherein the data paths among the subdomains include the crosspoint switch.

20. The network device of claim 19, further comprising one or more computer processors and a computer-readable storage device having computer executable instructions that control the one or more computer processors to:
  receive a first handle that designates a first virtual front panel and first virtual port and a second handle that designates a second virtual front panel and second virtual port; and
  operate the crosspoint switch to establish a data path between an I/O port on a first subdomain identified by the first handle and an I/O port on a second subdomain identified by the second handle.

* * * * *